US006493351B1

(12) United States Patent
Shideler (10) Patent No.: US 6,493,351 B1
(45) Date of Patent: Dec. 10, 2002

(54) COLLISION DETECTION ON A DIFFERENTIAL BUS

(75) Inventor: Ronald K. Shideler, Calgary (CA)

(73) Assignee: Nortel Networks Ltd., St. Laurent (CA)

( * ) Notice: Subject to any disclaimer, the term of this patent is extended or adjusted under 35 U.S.C. 154(b) by 0 days.

(21) Appl. No.: 09/295,652

(22) Filed: Apr. 21, 1999

(51) Int. Cl.[7] ............................................. H04L 12/413
(52) U.S. Cl. ...................................... 370/438; 370/445
(58) Field of Search ............................. 370/229, 257, 370/338, 342, 367, 362, 365, 397, 421, 423, 438, 445, 446, 447, 448, 451, 454; 709/253

(56) References Cited

U.S. PATENT DOCUMENTS

| | | | | |
|---|---|---|---|---|
| 4,807,109 A | * | 2/1989 | Farrell et al. ................ | 713/401 |
| 4,965,792 A | * | 10/1990 | Yano .......................... | 370/445 |
| 5,113,498 A | * | 5/1992 | Evan et al. ..................... | 710/8 |
| 5,446,735 A | * | 8/1995 | Tobagi et al. ................ | 370/445 |
| 5,726,976 A | * | 3/1998 | Thompson et al. ......... | 370/229 |
| 5,784,573 A | * | 7/1998 | Szczepanek et al. ........ | 370/463 |
| 5,790,603 A | * | 8/1998 | Maeda et al. ................ | 375/316 |
| 5,818,842 A | * | 10/1998 | Burwell et al. ............. | 370/250 |
| 5,974,051 A | * | 10/1999 | De Nicolo et al. .......... | 370/438 |
| 6,205,153 B1 | * | 3/2001 | Shaffer et al. .............. | 370/235 |
| 6,219,353 B1 | * | 4/2001 | Wight et al. ................. | 370/425 |
| 6,222,850 B1 | * | 4/2001 | Johnson ....................... | 370/445 |
| 6,343,071 B1 | * | 1/2002 | Lansford ..................... | 370/338 |

* cited by examiner

*Primary Examiner*—Hassan Kizou
*Assistant Examiner*—David Odland
(74) *Attorney, Agent, or Firm*—Bruce Garlick; Ken Bolvin (57) ABSTRACT

A controller module is coupled to a plurality of application modules over a backplane. The backplane comprises a differential bus(s) having a TX and RX data signal, a differential clock signal, and a single ended collision detection line. The application modules transmit data to the controller module. The controller module retransmits a recovered version of the data back to the application modules over the collision detection line. Each application module compares the retransmitted data bits with the data bits it originally transmitted. If the data is not the same, a collision has occurred and the application module removes itself from the bus. If the data is the same as that transmitted originally, that particular application module continues to transmit on the bus. Metastability at the controller module's differential receiver enables multiple differential transmitters to be on the differential bus at the same time.

19 Claims, 9 Drawing Sheets

COLLISION DETECTION ON A DIFFERENTIAL BUS

BACKGROUND OF THE INVENTION

I. Field of the Invention

The present invention relates generally to circuit board intercommunication. More particularly, the present invention relates to detecting collisions over a differential bus in an electronic assembly.

II. Description of the Related Art

Backplane communication links can be very capacitive. A single ended transceiver that is capable of transmitting/receiving over a capacitive backplane may not be able to achieve the same data rates, reliability and ease of use as industry standard off the shelf differential transceivers. This may require single-ended bus circuits to be either on a single circuit board or a limited number of circuit boards very near each other. Single ended transceivers work well in a low capacitive environment.

One way around the impedance and distance limitations is to use differential transceivers to form a differential bus. Some types of differential transceivers are designed for multipoint data transmission environments and work reliably in the presence of noise. Various types of differential transceivers are available as off the shelf parts and require few external parts to function; this makes them easy to use, reliable and less prone to malfunction. The differential bus allows multiple circuit boards to communicate with each other at various distances that are greater than what could be achieved with a single-ended bus. The drawback to this scheme is that a differential bus does not support collision detection the same way a single-ended bus can. There is a resulting need for a high data rate differential bus that handles multiple circuit boards over long distances and can function over a backplane while still supporting collision detection.

SUMMARY OF THE INVENTION

The present invention encompasses collision detection over a differential bus. An apparatus using collision detection encompasses an electronic assembly with a differential bus(s). The assembly comprises a controller module and a plurality of application modules. The controller module and the application modules communicate over a common bus(s) structure.

In one embodiment, the common bus structure is comprised of a differential transmit signal, differential clock signal, two differential receive signals, a single ended collision detection line, and a single ended select line. The redundancy on the receive buses and the use of the single ended select line are not required for the invention since, in another embodiment of the common bus structure, these signals are not used. The controller module sources the clock and select signals over their respective backplane signals.

The controller module retransmits the data that is recovered by that module, transmitted from the application modules, over the collision detection line. The controller module does not know if a collision is actually occurring. The application modules determine if a collision is occurring by monitoring the collision detection line and comparing it to the data that was sent by that particular application module. No notification of a collision is transmitted between the controller module and the application modules or between the application modules.

The plurality of application modules are each coupled to the differential bus and the collision detection line. Each application module has a processor for controlling the application module and has a data packet controller for originally transmitting the data packets over the differential bus to the controller module.

If a collision is detected on the differential bus, the particular application module experiencing the collision is removed from the bus by placing its three state bus drivers into a high impedance state. These drivers are controlled by the bus access control logic on that particular application module. The methodology used by the bus access control logic on the application module will depend on the type of differential transceivers used to implement the differential bus and the capabilities of the data packet controller on the application module.

DETAILED DESCRIPTION OF THE PREFERRED EMBODIMENT

The High-level Data Link Control (HDLC) A/B bus of the present invention is a high-speed, inter-card communication link. In the preferred embodiment, the bus is capable of synchronous operation at a sustained data rate of 2 Mbps. The HDLC A/B bus supports collision detection without intervention from the data packet controllers that are used on the controller module and application modules. In fact, the data packet controllers are not even aware that they are coupled to a differential bus. The collision detection apparatus, clock timing, and overall architecture of the present invention preserves the capability of the collision detection mechanism that is built into the data packet controllers.

The present invention is not limited to any one bus, such as the preferred embodiment's redundant HDLC bus. Alternate embodiments use other types of buses such as an original equipment manufacturer (OEM) HDLC bus that is described subsequently.

In the preferred embodiment, there are two types of differential buses used: one with redundant receive interfaces and one without redundant receive interfaces. The differential bus that an application module connects to depends on the requirements of that module. If a redundant bus is required, the module will connect to the redundant differential bus. If the redundancy is not required, the non-redundant bus may be used. Application modules typically only connect to one or the other type of differential bus, not both.

The controller module connects to both types of differential buses. In subsequent discussions of the methodology for collision detection over a differential bus, the text applies to either the redundant or nonredundant differential buses. The only difference between the two will be the redundant receive lines and the A/B select signal. The nonredundant differential bus has only one receive line and does not have an A/B select signal. Other than the redundancy, both differential buses function in the same manner but carry different data and are not synchronous with each other.

The present invention is not limited to any particular data rate that is discussed herein. However, there is obviously a maximum speed due to timing, device characteristics, and the time to recover from the metastability at the controller module.

Figure 1:
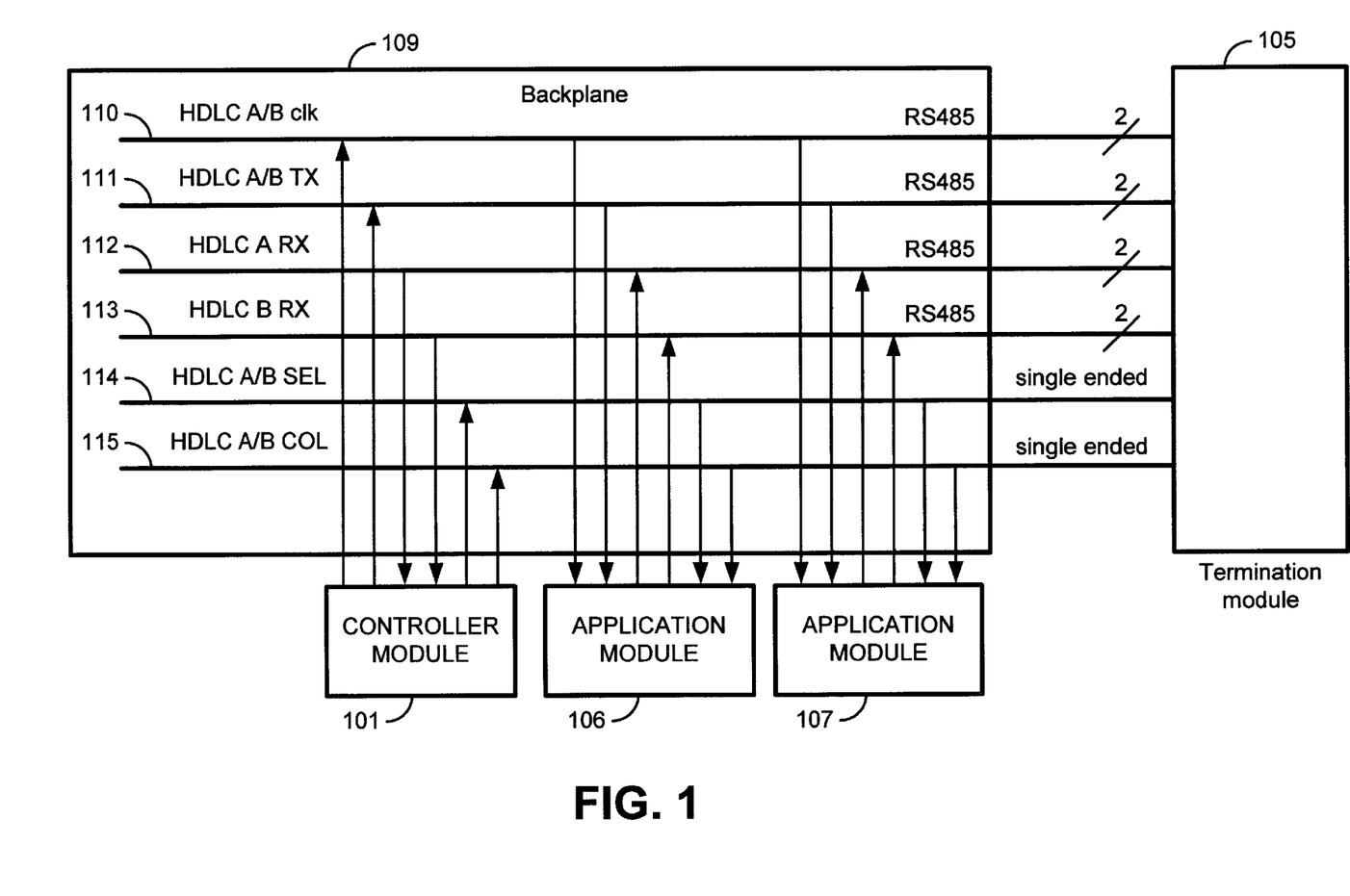
FIG. 1 shows a block diagram of an HDLC A/B redundant bus system.

A high-level block diagram of an HDLC A/B bus system is illustrated in FIG. 1. This system is comprised of a controller module (101), a termination module (105), a plurality of application modules (106 and 107), and the HDLC A/B bus structure (109). For clarity, only two application modules (106 and 107) are illustrated. Alternate embodiments use greater or lesser quantities of application modules. The maximum number of application modules depends on the mechanical features of the overall assembly and the type of differential transceivers used since each type of differential transceiver may only support a specific number of devices.

The link from the controller module to the application modules is a point to multi-point link. The link from the application modules to the controller module is a multi-point to point interface The termination module (105) is a bus terminator that provides differential termination on the far right side of each differential bus signal. In the preferred embodiment, the differential termination is a single resistor connected between the two signals of each differential signal that is part of the overall differential bus.

The controller module (101) terminates the left side of the differential signals with a differential resistor similar to the terminator module (105). The system controller also utilizes a pull up and pull down resistor on each differential signal to preset the corresponding single ended logic output of any receiver that may be connected to that differential signal. This is done so that a specific single ended logic state can be chosen as the idle condition when a particular differential signal is not being driven by a differential driver. All receivers should be in a valid logic state even when a particular differential signal is not being actively driven by a differential transmitter.

Figure 2:
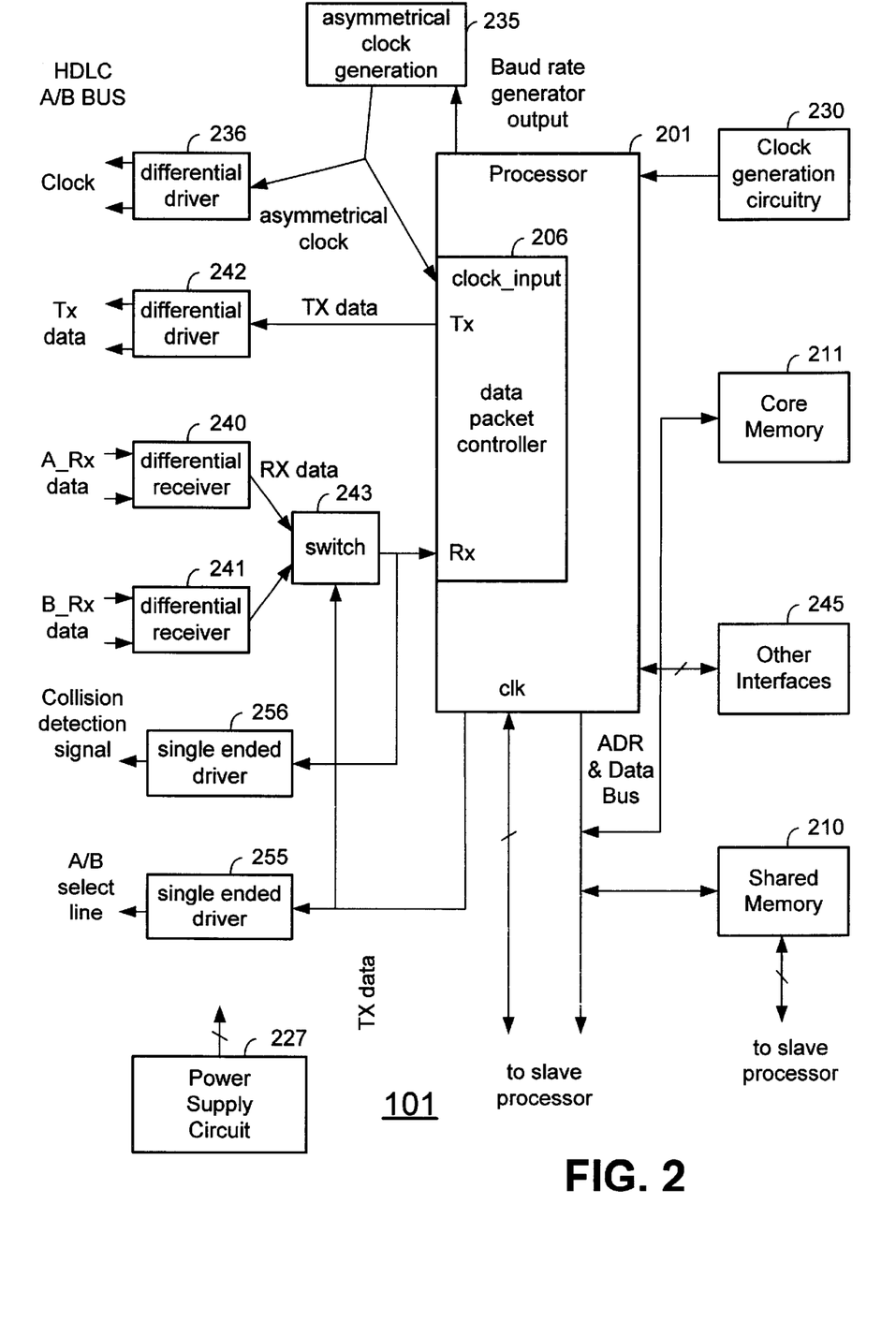
FIG. 2 shows a block diagram of an HDLC A/B bus system controller.

The system controller (101) is illustrated in FIG. 2. The system controller (101) controls the HDLC A/B bus that is connected between the system controller (101) and the application modules (106 and 107) of FIG. 1.

Figure 6:
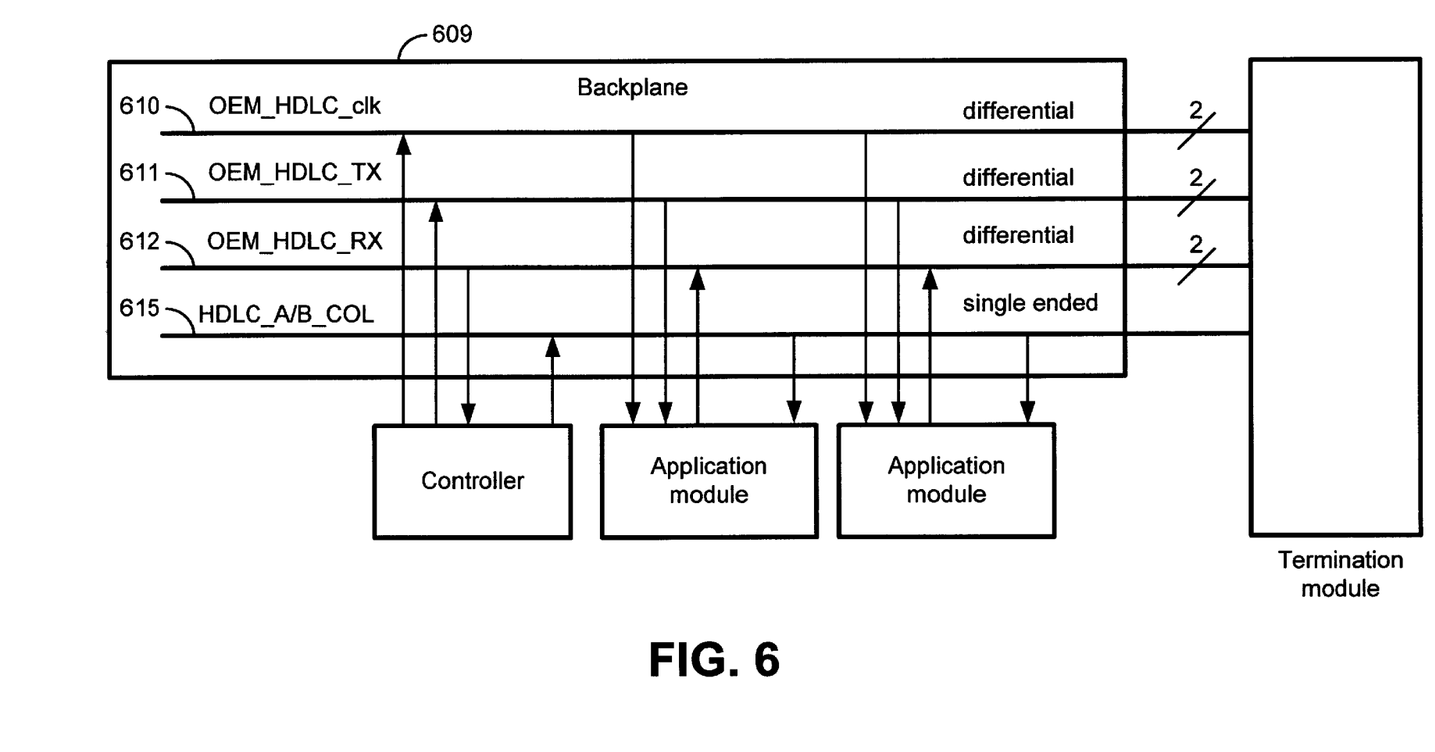
FIG. 6 shows an alternate embodiment OEM HDLC non-redundant bus system.

The controller (101) also controls the OEM HDLC bus, illustrated in FIG. 6, that is used in the overall system. The OEM HDLC bus is a nonredundant version of the HDLC A/B bus. The two differential buses function in a similar manner.

Referring to FIG. 2, the system controller (101) is comprised of a processor (201), such as the MOTOROLA MPC860MH (MH is the multi-channel version of the standard device), and a slave processor (205), such as the MOTOROLA MC68MH360. Each processor is comprised of a CPU and a Communications Processor Module. Alternate embodiments use other processors.

In the preferred embodiment, the MPC860MH CPU core executes the software code. The MC68MH360 is used in the slave mode where its CPU is disabled but its Communications Processor Module is enabled.

The system controller (101) is additionally comprised of various types of memory (210 and 211) for storing values and as a means of exchanging information between the processor (201) and slave processor (205). In the preferred embodiment, the memory (210 and 211) may include SRAM, Flash memory, DRAM, and various registers.

Both the processor (201) and the slave processor (205) have access to a different differential bus through their respective bus drivers (240–242 and 250). These two differential buses are not synchronous with each other.

The system controller (101) is also comprised of power supply circuitry (227) for supplying power to the system controller (101). A clock generator circuit (230) generates a clock to run the processor (201). A clock output of the processor (201) is used to drive the input clock of the slave processor (205). In this way the two processors (201 and 205) and the data/address bus interfaces are synchronous with each other.

Another clock generator (235) generates the asymmetrical clock, described subsequently, for transmission through a differential driver (236) to a differential bus. This signal is derived from a clock signal from a baud rate generator in the processor (201) and is used to drive the backplane and data packet controller interface timing. The output of the asymmetrical clock generation block (235) is connected to the HDLC bus interface clock input of the data packet controller so that the data packet controller will be synchronous with the application modules (106 and 107). The bus clock generator circuit (235) takes a clock signal with a 1:1 ratio from the respective processor and converts this waveform into the asymmetrical clock used on the backplane.

The data packet controller (206), located in the processor (201), has an HDLC A/B bus transceiver (240, 241, and 242) for accessing the HDLC A/B differential bus.

An A/B bus select line is driven by a single-ended driver (255). This select line is also used to switch (243) between the A and B receive buses. A single ended driver (256) also drives the collision detection signal on the bus.

The system controller (101) additionally has other types of bus interfaces (245) that enable the processor and slave processor to access other equipment. These interfaces (245) include RS232, 10BaseT, and T1 that are all well known in the art. Alternate embodiments use other types of interfaces or additional interfaces.

The above description of the system controller (101) is for the preferred embodiment. Not all of the circuitry is required for operation of the differential bus collision detection apparatus of the present invention. Alternate embodiments use other system controller configurations.

Referring again to FIG. 1, the application modules (106 and 107), in the preferred embodiment, are used to perform various duties for a cellular radiotelephone cell site. These duties may include communicating between the cell site radios and the public switched telephone network or controlling the radios. The main function of the applications modules of the present invention is to perform OA&M (operational alarms and maintenance activities) and downloading software into cellsite devices. The controller module also connects to a laptop PC (Nortel custom software application) which is also used for commissioning. Alternate embodiments may use application modules for tasks unrelated to radio communication.

The HDLC A/B backplane structure (109) of FIG. 1 is comprised of three data links. These data links are labeled HDLC A/B TX (111), HDLC A RX (112), and HDLC B RX (113). The bus is also comprised of a clock signal, HDLC A/B CLK (110), a single-ended select line HDLC A/B SEL (114), and a single-ended collision signal HDLC A/B COL (115).

An alternate embodiment, OEM HDLC bus, is illustrated in FIG. 6. The OEM HDLC backplane structure (609) of FIG. 6 is comprised of two data links. These data links are labeled OEM HDLC TX (611) and OEM HDLC RX (612). The bus is also comprised of a clock signal, OEM HDLC CLK (610), and a single-ended collision signal OEM HDLC COL (615). These two HDLC interfaces are completely independent of each other and there is no relationship between the data or the clocks used on the two interfaces.

Figure 9:
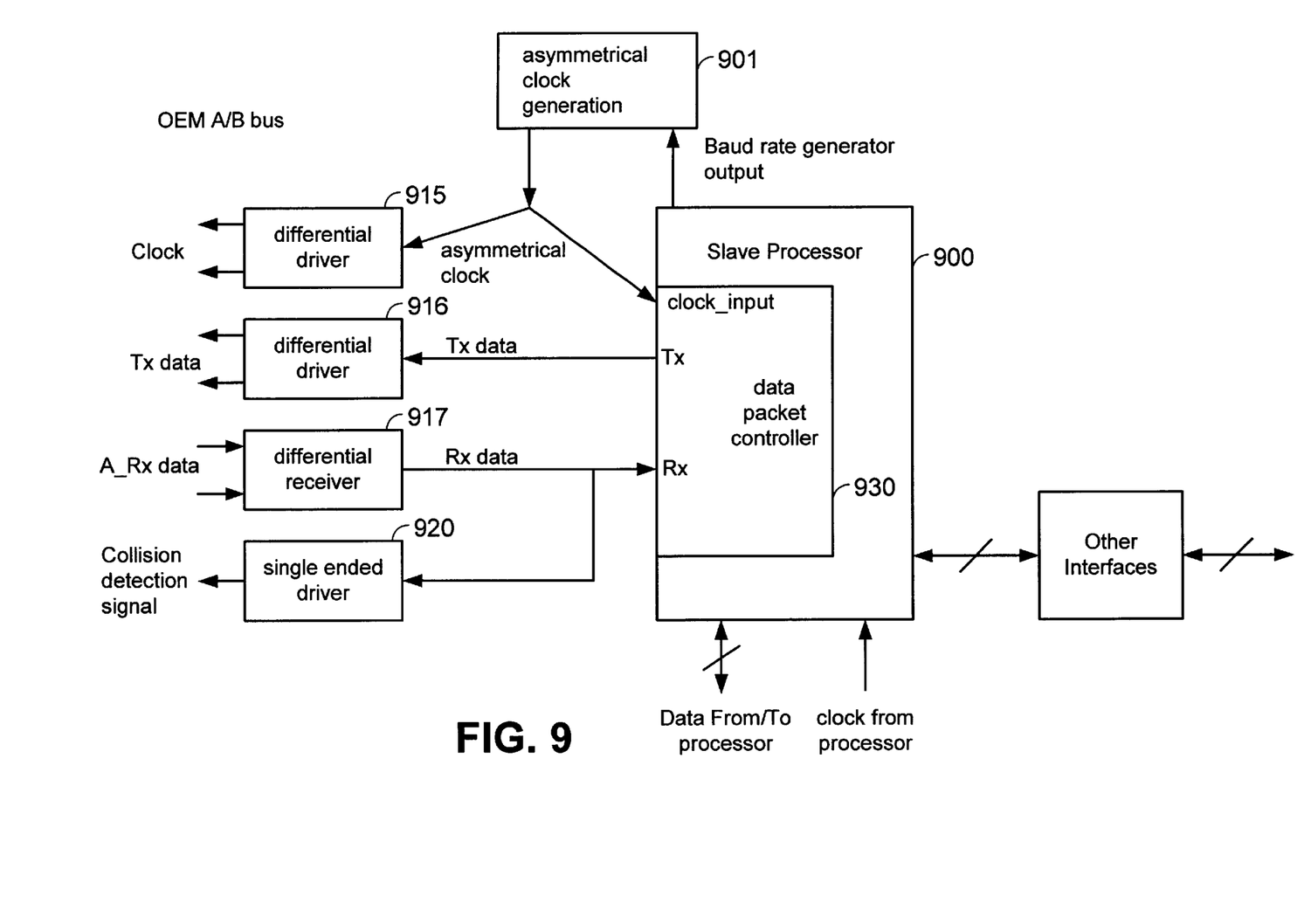
FIG. 9 shows a block diagram of a slave processor in accordance with FIG. 2.

The controller of the embodiment of FIG. 6 is illustrated in FIG. 9. This embodiment is comprised of the asymmetrical clock generation circuitry (901) that takes the symmetrical clock from the baud rate generator of the slave processor (900) and generates an asymmetrical clock. The output of the asymmetrical clock generation block (901) is also connected to the OEM HDLC interface clock input of the data packet controller (930) so that this data packet controller will be synchronized with any application modules (106 and 107) that are connected to the OEM HDLC bus. A similar clock connection is made between asymmetrical clock generation (235) and the data packet controller (206) of FIG. 2 for the HDLC A/B bus. The two clock generation blocks 235 and 901 are asynchronous with respect to each other.

As in the preferred embodiment, differential bus drivers (915–917) and single ended bus drivers (920) are used to interface the slave processor (900) to the OEM A/B bus. The slave processor (900) also shares data and memory with the control module's processor. The slave processor (900) additionally has a data packet controller (930) to originally transmit and receive data, control bus access and synchronize data to the asymmetrical clock.

RS485 bus drivers drive all of the output differential bus lines, in the preferred embodiment. These drivers are three-state, differential bus transceivers that are well known in the art. Each driver has a control input that disables the device by changing its output to a high impedance mode thereby removing that driver from the bus. RS485 bus receivers are also used to recover the differential signals present on the backplane. Alternate embodiments use other types of drivers to perform the same function as the RS485 drivers.

The controller module uses digital logic gates to drive the single ended signals that are part of the HDLC A/B and the alternate embodiment OEM HDLC buses. Each application module uses digital logic gates to buffer the single ended signals that are present on the backplane and are part of the differential buses.

The HDLC A/B TX line (111) is a point to multipoint communications link. The system controller (101) is the only module that transmits on the HDLC A/B TX line (111). Therefore, there will never be a collision on this interface since all the other modules are only listeners and never transmit on this signal line.

The HDLC A/B RX lines (112 and 113) are multipoint to point interfaces, each communications link is independent of the other and is designed to provide redundancy. Only one of the interfaces at a time will be actively conveying data, the other interface will not carry any data until it is required. The HDLC A/B RX lines (112 and 113) are used by the application modules (106 and 107) to transmit information to the system controller (101). The application modules monitor the HDLC A/B SEL line (114) to determine which interface is the active link that should be used for communications to the controller module.

As described above, the system controller (101) sources the clock, HDLC A/B CLK (110). In the preferred embodiment, the clock is asymmetrical and has a 25% duty cycle. This allows the maximum amount of time for the HDLC A or B RX signal from the application module (106 and 107) to propagate to the controller module via the RS485 links and then for the data to come back to the application module via the collision detection signal, HDLC A/B COL (115), as will be explained later.

The asymmetrical clock also allows time for the metastability that must occur on the receive interface of the system controller (101) to settle before the data is sampled by the system controller and the application modules. This same functionality occurs on the OEM HDLC bus.

Alternate embodiments use other clocks. For example, clocks with duty cycles other than 25%.

Also as described above, the system controller (101) sources the select lines, HDLC A/B SEL (114), and the collision detection signal, HDLC A/B COL (115). The select lines (114) are used by the system controller (101) to instruct the application modules (106 and 107) which side of the HDLC bus is currently active. This lets the application modules know whether to use the A side or B side of the HDLC A/B differential bus to send information to the system controller. These select lines are well known in the art and are not discussed further. The select line is not used on the OEM HDLC bus embodiment since it is a non-redundant interface.

Since the application modules (106 and 107) can transmit at the same time on the HDLC A/B RX lines, it is very likely that collisions between the transmitters of the two application modules will occur. The collision detection apparatus of the present invention feeds back the data the system controller is actually recovering so that each application module (106 or 107) can determine whether a collision has occurred. The system controller does not know how many application modules are transmitting at any given moment. The system controller does not even know that a collision occurred.

The system controller receives data on the HDLC A/B A or B bus and assumes that the data is correct. The system controller does check the overall packet for integrity once an entire packet of data has been received. Since collisions occur when two application modules are transmitting different data at the same time, the data that is received at the system controller will match one of the application modules actual TX data.

It is indeterminate when a collision occurs on the backplane what the receiver at the system controller will actually determine the data to be. The recovered logic bit could be a logic high or low. When metastability occurs on the system controller, it does not matter whether a logic one or a logic zero is recovered only that a valid data bit is recognized when the data packet controller on the system controller samples the received data. Since there are so many variables, such as number of application modules, and location of application modules, it is not possible to predict with any certainty what data will be recovered on the system controller when a collision occurs.

This invention provides the means whereby it is not necessary to predict what a collision will do to the data. Collisions occur and metastability occurs at the system controller but the differential receiver at the system controller will, after a period of metastability, source a valid logic level every time a collision occurs on the backplane. This recovered logic bit will match one of the application modules that is experiencing a collision so that the application module(s) will continue to transmit.

The application module(s) that sent data that did not match what was received by the system controller will stop transmitting, wait for the bus to become free again, gain ownership of the bus, and then retransmit the packet. Each application module has an equal opportunity to seize the bus and transmit its data packets to the system controller (101).

Metastability is an important aspect of the present invention. Digital designs typically avoid metastability so that logic errors will not occur in the system. This invention permits metastability to occur since this is what allows the collision detection of the present invention to operate on a differential bus architecture.

By connecting two or more differential drivers onto one differential signal and allowing them to broadcast at the same time means that metastability will occur at the differential receivers that are connected to this differential signal.

The number of collision occurrences on the backplane determines how many metastable events will occur. If there is only one application module in the system, a collision will not occur. If there is more than one application module in the system transmitting data to the system controller, collisions on the differential bus will be statistically linked to the number of application modules and the numbers of packets being transmitted at any one moment.

Metastability will not occur in the differential receiver on the controller unless a collision occurs on the differential signal of the backplane. The differential receivers incorporate digital logic circuitry to drive the single ended receive signal. It is somewhere in this differential receiver and its associated internal digital logic that metastability will occur.

Metastability is accounted for in the overall timing of the system and is given time to happen and settle. The asymmetrical clock allows metastability to occur without causing any negative effects on the overall data communication links. Any particular metastable event will not last forever. The digital logic receiver, after some period of time, will source a valid logic high or low. The present invention does not care whether the digital logic receiver sources a logic high or low only that the time period for each metastable event is minimized.

As long as the metastability does not affect the overall system it will not have a negative affect on data communications even though it may happen on a regular basis. The fact that metastability will not last forever and that the logic in the differential receiver located on the controller will source a valid logic signal after a period of time is well know in the art. The time period for metastability varies depending on the type of differential transceivers used and the various circuit conditions.

The amount of time for metastability to settle statistically covers a range where the majority of metastability occurrences will be within a nominal minimum and maximum range. As long as the overall timing budget for the system allows for this metastability timing range, the occurrence of metastability will not affect the operation of the system. The system timing should have some margin to allow for situations where metastability may take longer to settle or other timing parameters may extend to the maximum value.

The collision detection apparatus operates by the system controller (101) of FIG. 1 transmitting the recovered (either A or B) data bits across the backplane (109) on the HDLC A/B COL line (115). The application modules (106 and 107) monitor this line (115) to determine what the system controller (101) is actually receiving and compare the data bits to the data that the application module transmitted. If the data bits received do not match the data bits that were transmitted by that particular module, a collision has occurred and that application module will stop transmitting. This will clear the collision and allow communications to continue.

If multiple modules were transmitting one logic level and other modules were transmitting the other logic level, the occurrence of a collision will remove one set of transmitters from the line. The other group of modules that were successful will continue to transmit. The next occurrence of a collision will cause more transmitters to be removed from the line until only one transmitter is left. Even though there were collisions, the application module that is still transmitting will be able to finish the packet that it was sending. The occurrences of the collisions will not have affected the integrity of the data recovered at the controller since the application module verified that each bit that was transmitted was received correctly by the controller.

Figure 3:
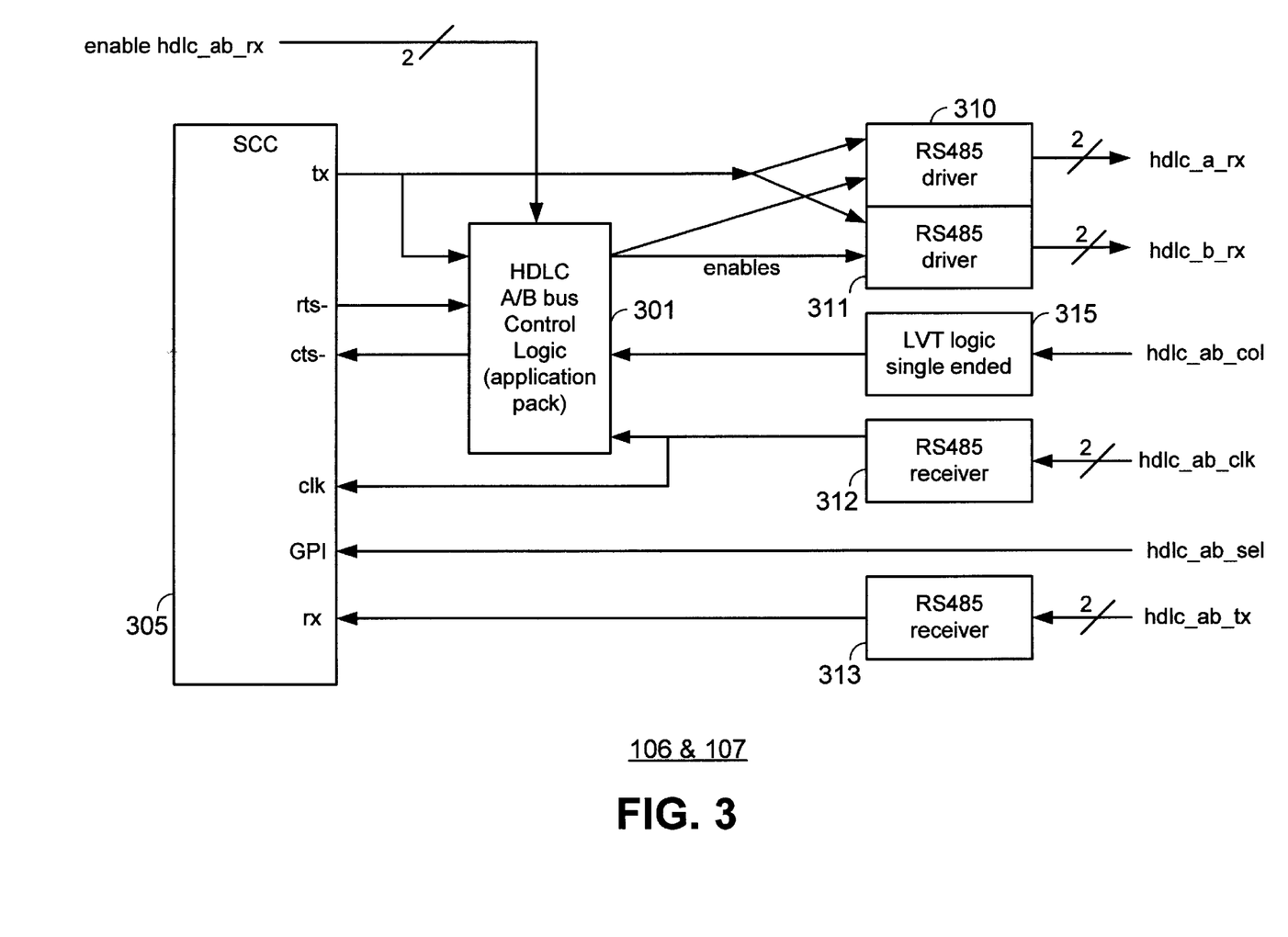
FIG. 3 shows a high-level block diagram of an application module incorporating HDLC A/B bus access control logic.

FIG. 3 illustrates the preferred embodiment of a high-level block diagram of an application module with HDLC A/B bus access control logic (301). This is only one example of an application module. Other embodiments have other functions and, therefore, other circuitry.

In the preferred embodiment, the data packet controller on the application module is comprised of a serial communication controller (SCC) (305) such as, for example, that which is present in a MOTOROLA MC68360MH device. Each SCC can be configured independently to implement different protocols for bridging functions, routers, and gateways. The SCC can also be configured to interface with a wide variety of standard WANs, LANs, and proprietary networks. The SCC has many physical interface options such as interfacing to TDM buses, ISDN buses, and standard modem interfaces.

The application module of FIG. 3 is additionally comprised of multiple differential bus drivers (310–313). As described above, these drivers are RS485 three-state drivers, in the preferred embodiment. The application module also has LVT-type single-ended receiver logic (315) for the HDLC A/B COL line from the system controller. Alternate embodiments use other types of logic than LVT, but LVT devices can withstand both live insertions and higher input signals that are at a higher potential than Vcc.

The HDLC A/B bus access control logic (301) is coupled to the enable inputs of the bus drivers that connect to the HDLC A/B RX bus. The other bus lines do not require controllable drivers since there is no possibility of a collision on these lines.

As described subsequently, when a collision occurs on the HDLC A/B RX lines due to data from a particular module, the control logic (301) of the module configures those drivers (310 and 311) on the module into it high impedance mode. This effectively removes the module from the HDLC A/B RX bus.

Figure 4:
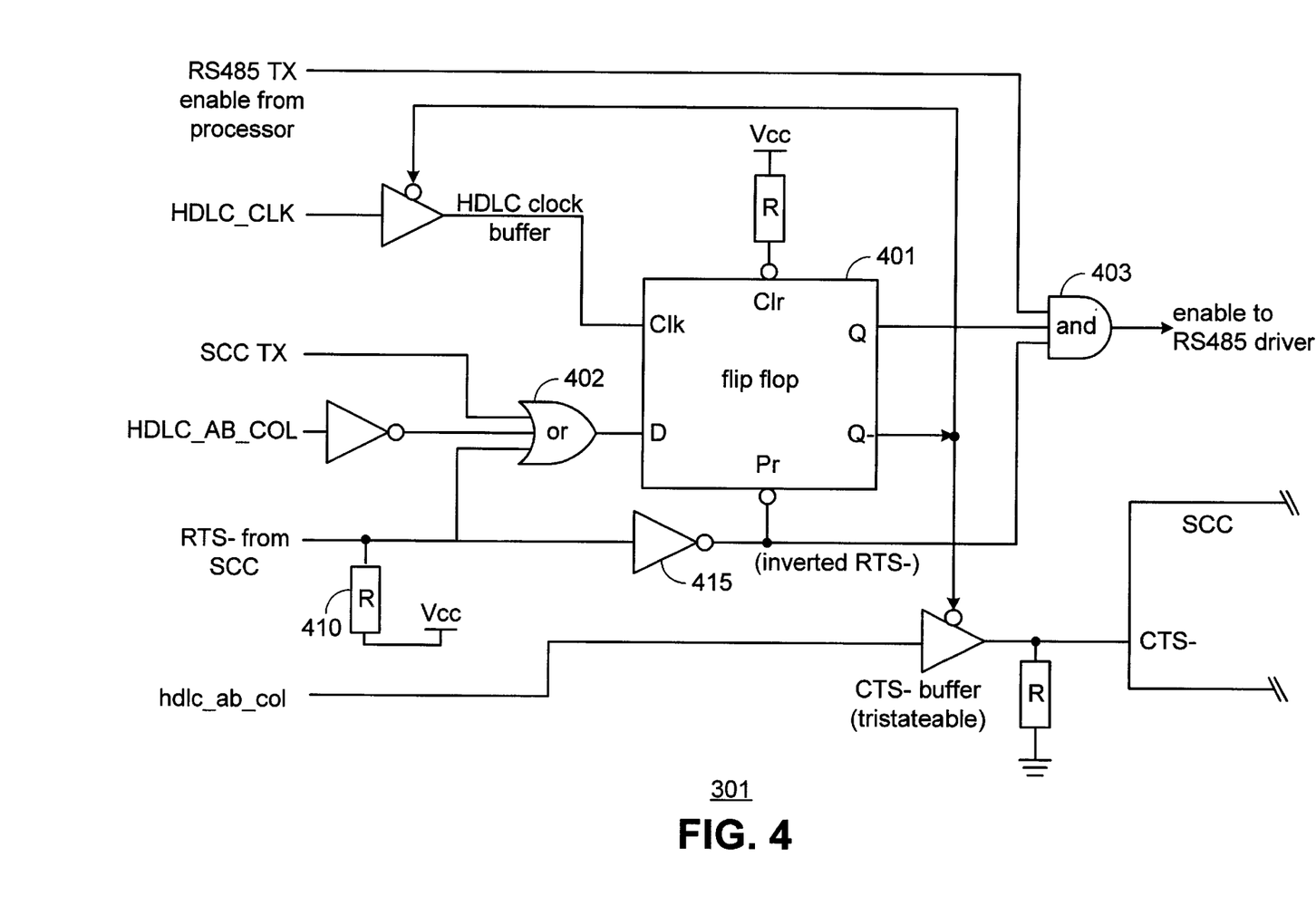
FIG. 4 shows a detailed schematic of a preferred embodiment of the HDLC A/B bus access control logic in accordance with FIG. 3.

FIG. 4 illustrates the HDLC A/B bus access control logic (301) for controlling the application modules' access to the bus through the bus drivers. This schematic illustrates the preferred embodiment for the bus access control logic implementation. Alternate embodiments that perform the same control function can be implemented using other circuits.

In the preferred embodiment, the bus access control logic is implemented in the data packet controller. Alternate embodiments implement the functionality in a programmable logic device, microprocessor, or discrete logic.

An example of an alternate embodiment control circuit is a microprocessor with control lines coupled to three state bus drivers. The microprocessor compares the input control signals as described subsequently and changes the mode of the bus drivers as appropriate.

Referring to FIG. 4, the Request to Send (RTS-, active low) line from the serial communication controller controls the operation of the circuit. The clock and data inputs are do not cares until the RTS-signal is a logic low. While the RTS-signal is a logic high, the flip-flop (401) is preloaded with the outputs of Q as a logic high and Q- as a logic low.

When a hard reset occurs, the RTS-signal will be high since the signal is coupled to a pull-up resistor (410). The inverted (415) RTS-signal is also connected to the enable for the RS485 driver. The RS485 driver is enabled high so until the RTS signal is low, the RS485 drivers will not be enabled. The only time the RTS-signal will be low is when the serial communication controller is transmitting data.

Assuming that the TX enable from the general purpose outputs (gpo) pins of the processor is set to an active high by the processor, as soon as the RTS-signal is low the flip-flop (401) latches data on the D input on the rising edge of the HDLC Clock. The RS485 driver is also enabled since all the inputs into the AND gate (403) are high.

While the RTS-signal is high and during the period the RTS-signal is low but, without a collision indication from gate 402, the Q- (negative output) output of the flip-flop (401) is low thus enabling the driver on the Clear to Send (CTS-, active low) input of the system controller. The CTS-input of the system controller is pulled low so that, if the CTS-buffer is disabled, the input of the system controller will see a valid logic low.

Since the RTS-signal is high while the serial communication controller is not transmitting, the CTS-buffer will be enabled and the serial communication controller is able to monitor the HDLC collision signal from the system controller. The serial communication controller determines if any other application modules are transmitting on the HDLC bus. If no other application modules are transmitting and the serial communication controller has a packet to send, it will follow the predefined procedures to seize the bus.

When the serial communication controller transmits (RTS-logic low), the RS485 driver will be enabled, the CTS-buffer will be enabled, and the HDLC CLK buffer will be enabled. The flip-flop (401) latches in data and the serial communication controller is checking the link for collisions.

The logic OR gate (402) on the input of the flip-flop (401) only activates in the case where the serial communication controller's TX output is a logic zero and the HDLC A/B COL line is a logic one. The logic is set up this way because this is the case where a collision occurred but the serial communication controller was not able to determine that it happened.

In the preferred embodiment, the serial communication controller on the processor for the application module is designed for an open drain interface. In this case, the open drain outputs are only actively driven when the device is transmitting a zero. This means that a logic zero has priority over a logic one.

In the case of a differential bus, each differential driver drives a logic one or a logic zero. Differential drivers have two outputs–a positive output and a negative output. A differential logic one will have a certain relationship between the positive and negative outputs depending on the type of differential driver.

The receiver looks at both input signals to determine whether the differential signal is a logic one or zero. It then sources a single ended logic one or zero on its single ended output depending on the logic level of the differential bus. If there are two application modules driving the differential bus, one device to a logic one and the other application module to a logic zero, it is indeterminate what the system controller will see. This will be dependent on the locations of the applications modules relative to the system controller, the type of differential drivers, temperature, and variation of the parts during manufacturing. Each vendor's parts will have variations so, depending on whether vendor 'A' parts are on one of the application module and vendor 'B' parts are on the application module, the system controller may see an entirely different value at its inputs.

If the collision occurs such that the signal levels on the backplane differential signal are invalid, the receiver on the system controller will go metastable for a period of time but will eventually source either a logic one or a logic zero. This is one reason for the clock's 25% duty cycle on the clock. The asymmetrical clock gives time for metastability on the system controller to settle so that, when a rising edge on the bus clock occurs, the collision signal at the input of the data packet controllers on the application modules is a valid logic level.

Each application module that is transmitting compares its transmitted data bit with the collision data signal transmitted back from the system controller over the HDLC A/B COL line. If the collision data bit does not match, a collision has occurred and the serial communication controller will cease to transmit and disable its differential drivers. The application module that transmitted the same data bit that was received from the system controller will continue to transmit and will continue to check each data bit for collisions.

The serial communication controller independently retries transmissions of data packets when a collision occurs. The control logic of FIG. 4 ensures that the serial communication controller detects even the specific case where it transmitted a logic zero and saw a logic one on the collision line from the system controller and attempts to retransmit the packet to the system controller. If some type of control circuitry is not used, the serial communication controller could transmit a number of data packets and not detect any collisions even though there were collisions in the differential bus. If the serial communication controller is not able to detect collisions on layer 1, the overall software would have to detect for corrupted packets. This may mean that a larger amount of data has to be re-sent than what would have been if the serial communication controller could detect collisions at its level. The overall goal of the HDLC logic control circuit of FIG. 4 is to increase the efficiency of the HDLC bus.

When the TX and collision data match, the control circuit does nothing since this is normal communication and there are no issues. If the serial communication controller transmitted a logic one and received a logic zero, the serial communication controller automatically detects this and de-asserts the RTS-signal thus disabling the RS485 drivers.

The serial communication controller then attempts to retransmit the packet of data when the bus is free. The HDLC control circuit does not have to do anything in this case since the serial communication controller is configured to handle this collision. It is only the collision case previously discussed that the serial communication controller is not able to detect that the HDLC control circuit will function.

The function of the HDLC control circuit of FIG. 4 is seamless to the serial communication controller. The serial communication controller does not know that the circuit or the rest of the HDLC architecture exists. The serial communication controller still thinks that it is transmitting on an open drain HDLC bus. When the specific case (error state) occurs where the serial communication controller transmits a logic zero and the HDLC A/B COL signal is a logic one (due to a collision on the backplane) and the RTS-signal is active (logic zero), the D input to the flip-flop (401) will be a logic zero. The HDLC A/B COL signal is inverted before the OR gate (402) so when the HDLC A/B COL signal is a logic one the actual signal at the input of the OR gate (402) will be a logic zero. Since all the inputs of the OR gate (402) during the specific events outlined in this paragraph will be a logic zero the output of the OR gate (402) will be a logic zero, this is standard binary logic for an OR gate.

The D input of the flip-flop (401) is normally a logic one but when the collision event occurs, the D input will be a logic zero. When the rising edge of the HDLC CLK occurs, the low level on the D input is latched into the flip-flop (401). The Q output of the flip-flop (401) is low and the Q-output is high.

When the Q-output goes low, the CTS-buffer is disabled, the CTS-input of the serial communication controller then constantly reads a logic low regardless of what the system controller is sourcing on the HDLC A/B COL line. The Q output is a logic low, thus disabling the RS485 driver so that no further collisions occur. The HDLC CLK buffer will also be disabled since it is connected to the Q-output of the flip-flop. This will result in no further clocks to the flip flop (401) so the Q and Q-outputs will no longer change if the value of the D input changes. This effectively latches the CTS line in a low state and disables the RS485 driver.

The serial communication controller is not able to detect this error state collision so it will actually keep transmitting the data packet and the RTS-signal will still be active. The serial communication controller will still be getting the HDLC CLK so on the next rising edge it will compare the data it sent out with the CTS-pin which is tied low at this point. If the serial communication controller continues to send a number of zeros, it will not detect any problems, only when it sends a logic one and sees that the CTS-pin is low (logic zero) will it detect a collision.

Even though the error state collision occurred earlier in time, the serial communication controller does not see the collision until it transmits a logic one. It is not important that the serial communication controller did not detect the collision at the exact moment that it occurred. It is only important that it detected the collision before it reached the end of the packet.

The serial communication controller will retransmit the entire packet if there was a problem with the original transmission. Therefore, even though the exact bit when the error state collision occurred was not detected, the overall goal of getting the serial communication controller to retransmit the packet without having to get any higher level of software involved has been achieved.

When the serial communication controller finally detects the collision, it will deactivate the RTS-signal (set to logic high). This resets the HDLC control circuit of FIG. 4 to the initial state and re-enables the CTS-buffer. Re-enabling the CTS-buffer allows the serial communication controller to monitor the backplane collision signal. When the serial communication controller sees that the backplane is free, it will attempt to seize the bus again and when it has seized the bus it will start to retransmit the data packet that was corrupted due to the previously mentioned error state collision.

Figure 5:
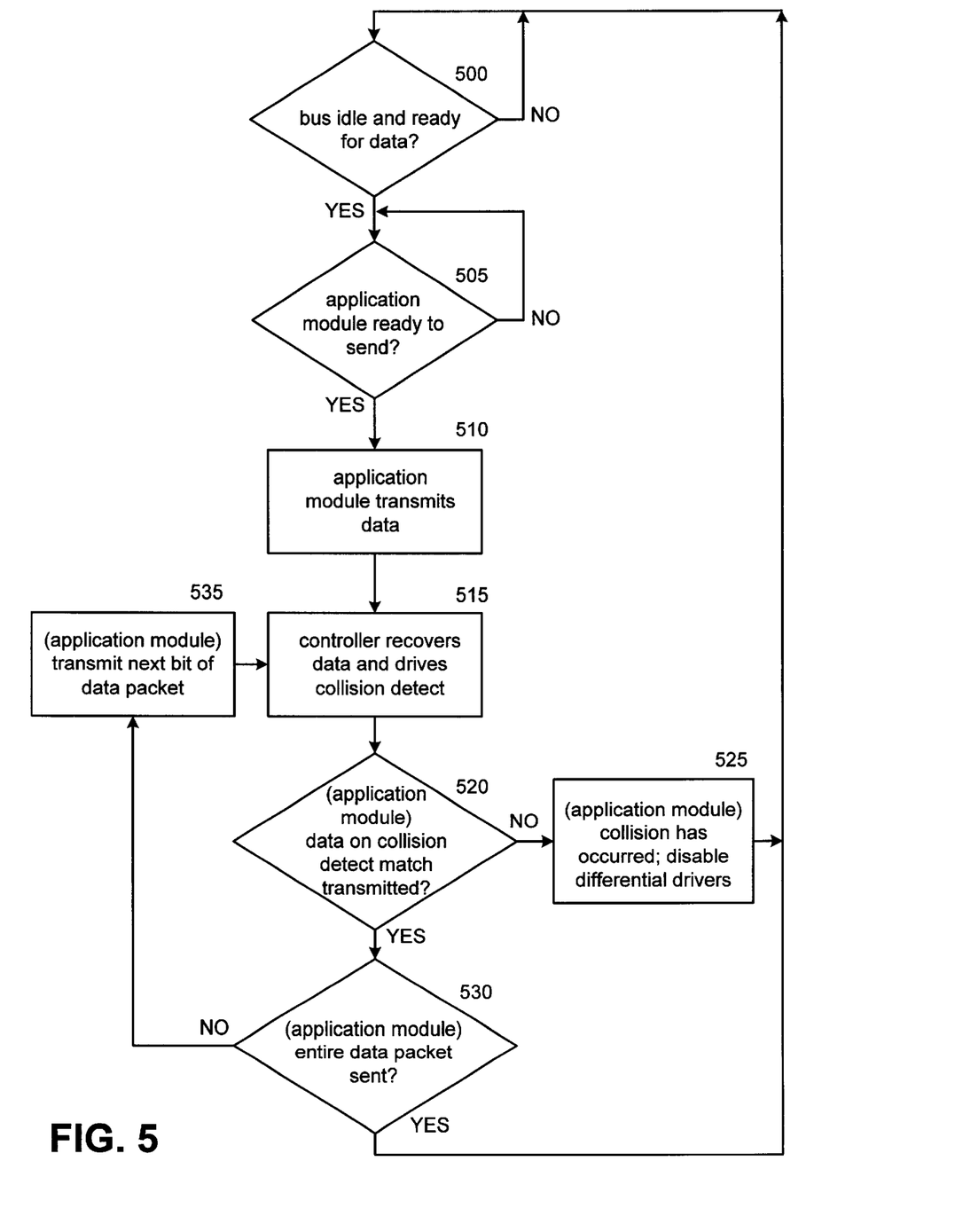
FIG. 5 shows a flowchart of a collision detection process of the present invention.

FIG. 5 illustrates a flowchart for the collision detection process of the present invention. This process begins with the bus being idle and ready for data to be transmitted (step 500). Either one or all of the application modules may have data to transmit (step 505). At some point an application module(s) will start to transmit on the bus (step 510). The data packet controllers wait for the bus to be free but several devices may transmit at the same time since they have equal priority to the bus.

The controller module (101) then receives (transmit lines are serial so data is sent one bit at a time) the data that was transmitted (step 515). The controller module (101) retransmits the recovered data back to the application modules (step 515) over the collision detection line. If no collision occurred during the transmission, the data on the collision detection line will match the data that was transmitted (step 520). If a collision has occurred (step 525), the system controller (101) transmits totally random data to the application modules. Given that a collision occurred the random data will match one of the application modules that is experiencing a collision, since one device must be transmitting a logic low and the other device a logic high for a collision to have occurred.

Each application module compares the data bit that was retransmitted by the controller module to the data bit that the particular application module originally transmitted (step 520). If the data bit matches (step 520), the application module with the matching data bit continues to transmit to the bus (step 535). If the entire data packet has been transmitted (step 530), the process returns to checking for an idle bus (step 500). If the entire data packet has not been transmitted (step 530), the application module transmits (step 535) the next bit of data packet and the controller recovers that data and drives the collision detection line (step 515).

If the data bit does not match (step 520), in other words, there was a collision, that particular application module removes itself from the bus (step 525) as described previously. This process will repeat throughout the entire data packet.

Figure 7:
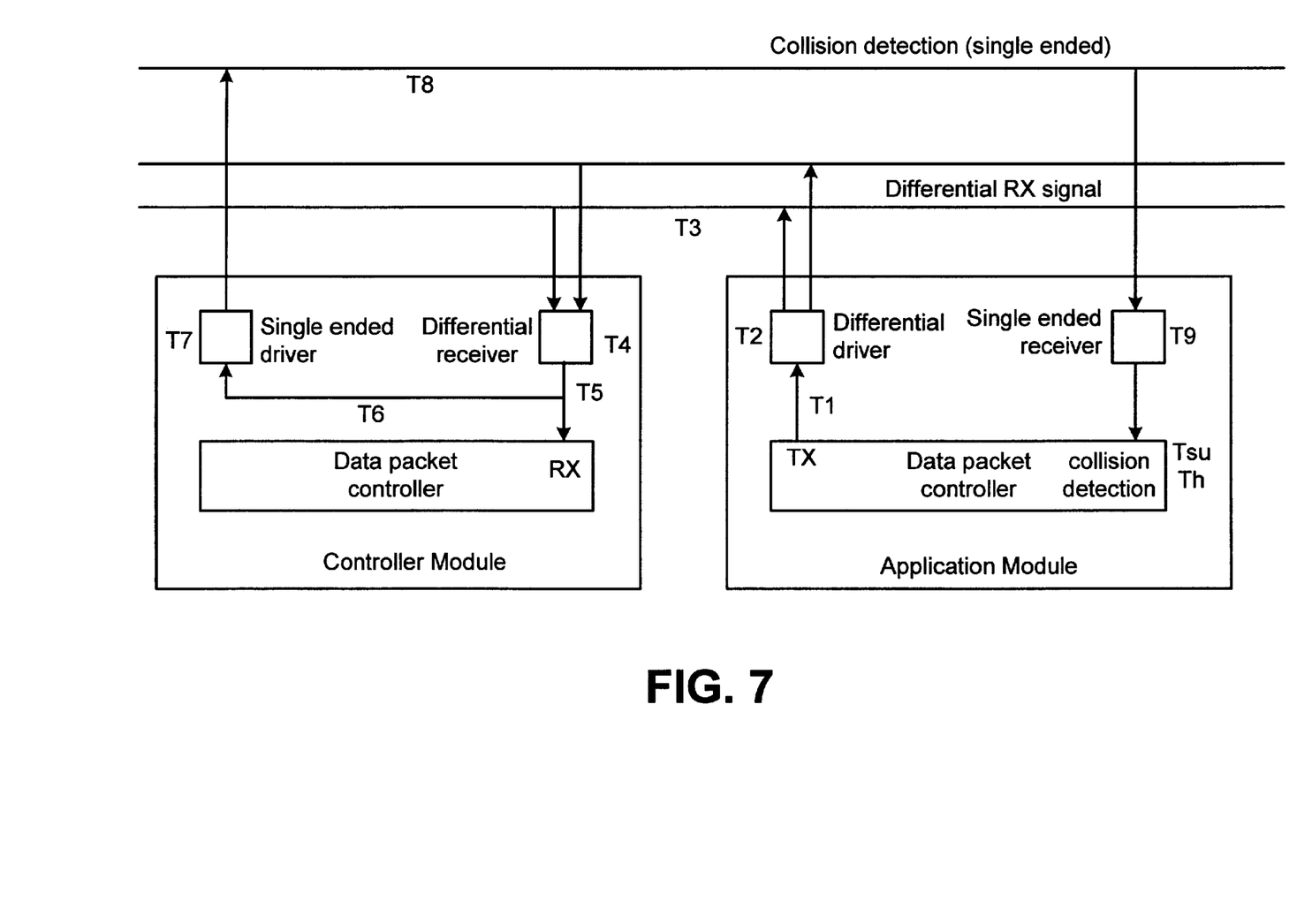
FIG. 7 shows a block diagram illustrating the major time delays in accordance with the present invention.

A block diagram of the controller module and an application module is illustrated in FIG. 7 for timing purposes. This diagram illustrates the major time delays associated with communication between the application module and the controller module. The numerical value of each time depends on the types of devices used, the distances between the devices, the number of modules, temperature, humidity, and other factors.

The time delays are as follows:

T1—Delay of application module to transmit data from the falling edge of the clock.

T2—Propagation delay through the application module differential driver.

T3—Propagation delay across the differential signal on the backplane.

T4—Propagation delay through the controller module differential receiver.

T5—Time for metastability to settle (if there is no collision this may be zero).

T6—Time for recovered data to propagate to the single ended transmitter.

T7—Propagation delay through the controller module single ended transmitter.

T8—Propagation delay across the single ended signal on the backplane.

T9—Propagation delay through the single ended receiver on the application module.

$T_{total}$ is the total of the above timing factors.

Figure 8:
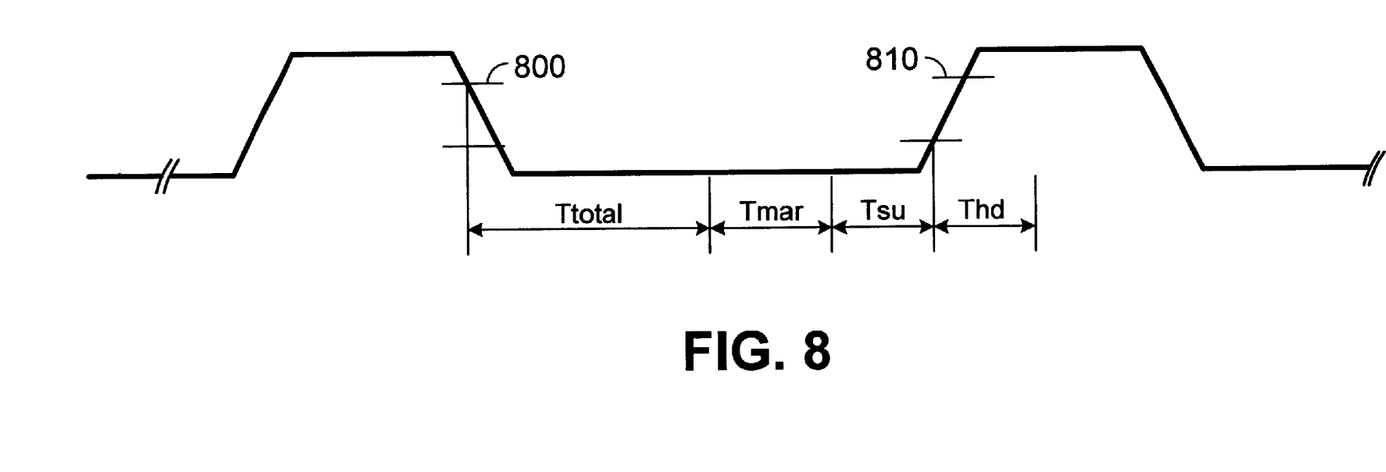
FIG. 8 shows the asymmetrical clock with time delay overlays in accordance with the time delays of FIG. 7.

FIG. 8 illustrates the timing delays of FIG. 7 superimposed on the asymmetrical system clock of the present invention. The application modules transmit data on the falling edge (800) of the clock. $T_{total}$, as discussed above, extends from this falling edge (800).

The setup time, $T_{su}$ required at the application module collision detection input occurs prior to the rising edge (810) of the next clock pulse. This is the clock edge on which the controller latches in data. This is also the clock edge on which the application modules latch in collision data. $T_h$ is the data hold time required at the application module collision detection input.

$T_{mar}$, illustrated in FIG. 8, is the timing margin remaining in the overall timing budget once $T_{total}$ and $T_{su}$ have been taken into account. The period and percentage of asymmetry in the clock can be changed to meet the overall timing requirements of the system.

In summary, the collision detection apparatus of the present invention enables a group of cards or modules with data packet controllers that were designed for single ended open drain interfaces to operate over a differential bus. The data packet controllers function as if they were communicating over a single ended, open drain interface without any loss of functionality.

The present invention provides a low cost, simple way of connecting data packet controllers to a differential bus that were not designed for a differential bus. By allowing the collision to occur and letting each application module determine whether it was successful in being received, enables the successful module to continue using the bus while the other modules relinquish the bus until the successful module has completed its transmission.

The present invention does not require the system controller or higher level software to intervene in the communication and collision detection process. The overall invention maximizes the bus's efficiency given the architecture of the bus since not all modules have to cease transmission and retransmit later.

I claim:

1. An electronic assembly having a differential bus, the assembly having the ability to detect collisions on the differential bus, the electronic assembly comprising:

a common bus assembly comprising the differential bus and a collision detection line;

an asymmetrical clock generator, coupled to the common bus assembly, for generating an asymmetrical clock that permits metastability to occur;

a controller module, coupled to the common bus assembly, for controlling component of the electronic assembly, the controller module receiving bits of data packets over the differential bus, the controller module comprising means for returning the bits of the data packets over the collision detection line; and a plurality of application modules, each coupled to the differential bus and the collision detection line, each application module having means for originally transmitting the bits of data packets, in response to the asymmetrical clock, over the differential bus to the controller module, each application module further including means for receiving bits of the data packets returned by the controller module over the collision detection line and comparing the bits of the data packets returned by the controller module over the collision detection line to the originally transmitted bits of the data packets in order to detect a collision on the differential bus.

2. The electronic assembly of claim 1 wherein each of the plurality of application modules includes a differential bus access control circuit that controls the application module's access to the differential bus.

3. The electronic assembly of claim 2 and further including bus drivers coupling each of the plurality of application modules to the differential bus, the bus drivers being coupled to and controlled by the differential bus access control it such that an application module detecting a collision on the differential bus is removed from the differential bus by the differential bus access control circuit placing at least one respective bus driver in a high impedance state.

4. The electronic assembly of claim 2 wherein the differential bus access control circuit is comprised of a programmable logic device.

5. The electronic assembly of claim 2 wherein the differential bus access control circuit is comprised of a data packet controller.

6. The electronic assembly of claim 1 wherein all modules of the electronic assembly are synchronized to the asymmetrical clock.

7. The electronic assembly of claim 1 wherein the common bus assembly further comprises a select line for notifying the plurality of application modules which side of the differential bus is active.

8. The electronic assembly of claim 1 and further including a termination module coupled to the common bus assembly, the termination module terminating one side of the common bus assembly.

9. The electronic assembly of claim 8 wherein the common bus assembly is terminated on the other end by the controller module.

10. The electronic assembly of claim 1 wherein the means for returning the bits of the data packets over the collision detection line of the controller module includes a data packet controller.

11. The electronic assembly of claim 1 wherein the asymmetrical clock signal includes a first phase and a second phase, wherein the second phase has sufficient duration to allow time for metastability to occur in the electronic assembly.

12. A method for detecting a collision on a differential bus in an electronic assembly, the electronic assembly comprising a controller module and a plurality of application modules, the method comprising the steps of:

at least one application module of the plurality of application modules transmitting data over the differential bus;

the controller module receiving the data as received data;

the controller returning the received data over a collision detection line to the plurality of application modules;

at least one application module of the plurality of application modules comparing the received data returned tom the controller module to the transmitted data;

if the received data returned from the controller module is not equal to the transmitted data, at least one application module of the plurality of application modules restricting transmit access to the differential bus; and at least one application module of the plurality of application modules retrasmitting the data when the differential bus is idle.

13. The method of claim 12 and further including the step of if the received data returned from the controller module is equal to the transmitted data, the application module having the transmitted and returned data equal continues transmitting on the differential bus.

14. An application module that communicates over a differential bus with a controller module, the application module comprising:

a processor for controlling the processes of the application module, the processor including means for comparing recovered data received from the controller module with data transmitted from the application module wherein the inequality of the comparison indicates a collision on the differential bus;

bus drivers, coupled to the differential bus, for transmitting data from the processor over the differential bus, the bus drivers having a low impedance state and a high impedance state;

a collision detection line coupled to the controller module, the collision detection line receiving the recovered data from the controller module; and bus access control logic for controlling the low and high impedance states of the bus drivers in response to an indication of the collision on the differential bus.

15. The application module of claim 14 wherein a data packet controller incorporates the bus access control logic and is part of the processor.

16. A controller module that communicates over a bus assembly, comprising at leant one differential bus and a collision detection line, with a plurality of application modules, the controller module comprising:

a processor for controlling the processes of the controller module, the processor having a baud rate generator for generating a clock;

a plurality of bus interfaces for coupling the controller module to the bus assembly, the plurality of bus interfaces both transmitting and receiving data from the application modules over the at least one differential bus;

asymmetrical clock generation circuitry, coupled to the processor baud rate generator, for generating an asymmetrical clock for transmission over the bus assembly; and wherein the controller module returns data to the application modules via the collision detection line that was originally received from the application modules.

17. The controller module of claim 16 wherein the clock is asymmetrical.

18. The controller module of claim 16 and farther including a slave processor coupled to the processor, the slave processor comprising a data packet controller.

19. The controller module of claim 16 wherein the processor includes a data packet controller for controlling the transmission of data, the data packet controller coupled to receive the clock.

* * * * *